United States Patent
Clark et al.

(10) Patent No.: US 8,042,908 B2
(45) Date of Patent: Oct. 25, 2011

(54) FLUID EJECTOR DEVICE

(75) Inventors: Benjamin Clark, Corvallis, OR (US); Jeremy Harlan Donaldson, Corvallis, OR (US); Mark Sanders Taylor, Monmouth, OR (US); Joe E. Stout, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1123 days.

(21) Appl. No.: 11/829,354

(22) Filed: Jul. 27, 2007

(65) Prior Publication Data

US 2009/0025635 A1    Jan. 29, 2009

(51) Int. Cl.
*B41J 2/135*    (2006.01)

(52) U.S. Cl. ............. 347/45; 347/56; 347/44; 347/47

(58) Field of Classification Search .......... 347/44, 347/45, 47, 54, 55, 56
See application file for complete search history.

(56) References Cited

U.S. PATENT DOCUMENTS

| | | | |
|---|---|---|---|
| 4,643,948 A | 2/1987 | Diaz et al. | |
| 5,010,356 A * | 4/1991 | Albinson | 347/45 |
| 5,017,946 A * | 5/1991 | Masuda et al. | 347/45 |
| 5,119,116 A | 6/1992 | Yu | |
| 5,516,813 A | 5/1996 | Starkey | |
| 5,905,517 A | 5/1999 | Silverbrook | |
| 6,448,346 B1 | 9/2002 | Noguchi et al. | |
| 6,472,129 B2 | 10/2002 | Noguchi et al. | |
| 6,484,399 B2 | 11/2002 | Aono et al. | |
| 6,713,128 B2 | 3/2004 | Shimomura et al. | |
| 6,737,109 B2 | 5/2004 | Stanton et al. | |
| 6,750,290 B2 | 6/2004 | Imamura et al. | |
| 6,766,579 B2 | 7/2004 | Ohkuma | |
| 7,074,273 B2 | 7/2006 | Shimomura et al. | |
| 7,087,710 B2 | 8/2006 | Medsker et al. | |
| 7,156,506 B2 | 1/2007 | Tsukada et al. | |
| 2001/0017639 A1 * | 8/2001 | Noguchi et al. | 347/45 |
| 2005/0088485 A1 | 4/2005 | Tamahashi et al. | |
| 2005/0129859 A1 | 6/2005 | Misev et al. | |
| 2006/0268059 A1 | 11/2006 | Wu et al. | |
| 2006/0274113 A1 * | 12/2006 | Ono | 347/45 |

FOREIGN PATENT DOCUMENTS

| | | |
|---|---|---|
| JP | 07148930 | 6/1995 |
| JP | 2000355106 | 12/2000 |
| JP | 2000355106 A * | 12/2000 |
| JP | 2001233972 | 8/2001 |

OTHER PUBLICATIONS

International Search Report for Application No. PCT/US2008/071227. Report issued Jan. 29, 2009.

* cited by examiner

*Primary Examiner* — Manish S Shah

(57) ABSTRACT

A fluid ejector device, including: a fluid nozzle layer defining an orifice therein; and at least one epoxy resin layer established on the nozzle layer, the at least one epoxy resin layer having first and second opposed surfaces with a thickness there between and a fluorine gradient formed therein such that the gradient extends into at least a portion of the thickness of the at least one epoxy resin layer, wherein an amount of a fluorinated species present in the at least one epoxy resin layer at the first opposed surface is greater than an amount of the fluorinated species present in the at least one epoxy resin layer at the second opposed surface that is adjacent the fluid nozzle layer.

16 Claims, 1 Drawing Sheet

FLUID EJECTOR DEVICE

BACKGROUND

Inkjet printing involves non-impact printing methods where droplets of ink are deposited on print media to form a desired image. In some instances, interaction between the ink and inkjet printer nozzle surfaces may cause undesired effects.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Interaction between ink and inkjet printer nozzle surfaces may result in nozzle clogging, ink puddling, and/or the like. In attempts to reduce the potentially undesirable ink-nozzle interaction, nozzle surfaces have been formulated with lower surface energy coatings. Resin layers and higher molecular weight surface energy lowering agents have been established on nozzle surfaces. While some of the higher molecular weight surface energy lowering agent diffuses to the nozzle surface, some of the agent dissolves in the resin. As such, the resulting layer of higher molecular weight surface energy lowering agent on the resin is relatively thin. Such thin layers may be desirable where the top, low surface energy layer has openings that are larger than the nozzles themselves, specifically making servicing and wiping the top layer easier. Including such layers on the nozzle may, however, involve additional and/or costly processing steps.

Plasma ashing processes have been integrated into processes used by the present inventors for forming thermal inkjet printers. Without being bound to any theory, it is believed that ashing and/or other subsequent processes (such as wiping, high pressure water spraying, taping, wafer slotting, wafer sawing, TMAH wet etch, and the like) may deleteriously affect the low surface energy resin films that may be established on nozzle layers.

Embodiment(s) of the fluid ejector device disclosed herein advantageously include a coating layer that has a lower surface energy than an underlying nozzle layer. The coating layer disclosed herein has a fluorine gradient which is believed to effectively contribute to the ability to re-establish the low surface energy and high contact angle of the coating layer after being subjected to potentially deleterious processes, such as ashing. Without being bound to any theory, it is believed that the lower surface energy coating layer disclosed herein also facilitates ink ejection, priming, and servicing of the firing chamber and orifice plate, while substantially reducing puddling and/or ink accumulation on the orifice plate.

Figure 1A:
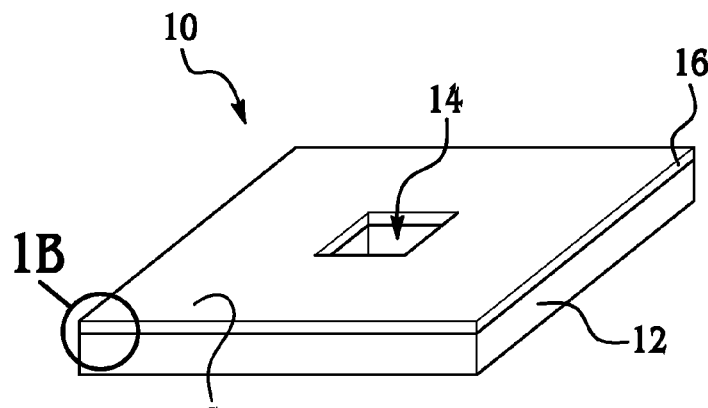
FIG. 1A is a semi-schematic perspective view of an embodiment of the fluid ejector device.
Figure 1B:
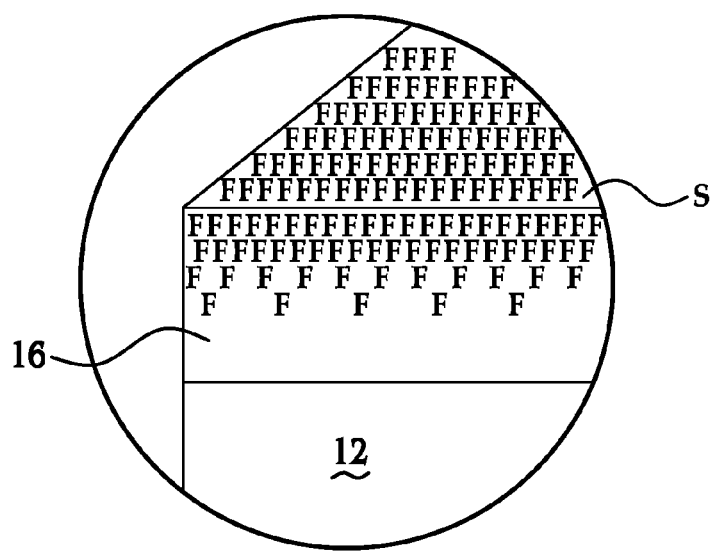
FIG. 1B is an enlarged semi-schematic perspective view of a portion of the embodiment of the fluid ejector device of FIG. 1A illustrating an embodiment of a fluorine gradient.

Referring now to FIGS. 1A and 1B together, the fluid ejector device 10 generally includes a fluid nozzle layer 12 with an orifice 14 defined therein, and one or more epoxy resin layers 16 established on the nozzle layer 12. As discussed further hereinbelow, the epoxy resin layer 16 has a contact angle that is substantially higher, and a surface energy that is substantially lower, than that of the nozzle layer 12. The epoxy resin layer 16 also has a fluorine gradient such that a greater amount of fluorinated species F (shown in FIG. 1B) is present at a surface S of the epoxy resin layer 16 than is present adjacent the nozzle layer 12. It is generally desirable to have little or no fluorinated species F present adjacent the nozzle layer 12, as such species F near this interface may lead to potential delamination between the nozzle layer 12 and the epoxy resin layer 16.

In one embodiment of the method of forming the device 10, the nozzle layer 12 is formed, and then the epoxy resin layer(s) 16 is/are established thereon. In another embodiment of the method, the nozzle layer 12 and the epoxy layer(s) 16 are formed and established substantially simultaneously. The latter method may be accomplished, for example, by dry film fabrication processes.

Generally, the nozzle layer 12 may be formed of any suitable material that is capable of withstanding prolonged exposure to inkjet inks. A non-limiting example of a material suitable for forming the nozzle layer 12 includes photoimageable epoxies, such as, for example, SU8 (a diglycidyl ether bisphenol A (DGEBA) based negative photoresist), photoimageable polysiloxane-based chemistries such as polyset, photoimageable polyimides, polynorbornenes, and/or the like, and/or combinations thereof.

The orifice 14 may be formed in the nozzle layer 12 by exposing one or more areas of the nozzle layer 12 to UV light, followed by a post-exposure bake to induce crosslinking of the epoxy, followed by removal (e.g., using a suitable solvent) of the unexposed portion. Such removal forms the orifice 14. The dimensions of the orifice 14 may be any suitable dimensions for ejecting ink therefrom. As a non-limiting example, the orifice 14 diameter ranges from about 6 microns to about 50 microns. In another non-limiting example, the orifice 14 diameter ranges from about 7 microns to about 22 microns.

The epoxy resin layer 16 having the fluorine gradient therein may be formed by adding a relatively high weight percent of total fluorinated species F (that may be substantially dissolved in one or more solvent(s)) to an epoxy resin, and then exposing the fluorine doped epoxy resin to a bake process. In a non-limiting example, the bake process takes place at about 170° C. It is to be understood that this temperature may be adjusted, depending, at least in part, on the materials selected.

It is believed that the bake process drives the fluorinated species F to migrate to the surface S of the epoxy resin layer 16, thereby forming the gradient. It is further believed that the amount of fluorinated species F loaded into the epoxy resin prior to the bake process impacts the amount of the fluorinated species F present at the surface S of the epoxy resin layer 16 after the bake process. As discussed further hereinbelow, it is desirable that the portion of the fluorine gradient saturated with the fluorinated species F be located at the surface S of the epoxy resin layer 16. As such, the "high weight percent" of total fluorinated species F, as the phrase is used herein, means that the total amount of fluorinated species F added to the epoxy resin is sufficient to achieve a fluorine gradient in which the fluorine at the surface S of the layer 16 is present at a desirable thickness. In an embodiment, at least about 10 wt % of total fluorinated species F is loaded in the epoxy resin prior to the bake process. As a non-limiting example, the total fluorinated species F ranges from about 10 wt % to about 75 wt %.

In an embodiment, the fluorinated species F has a molecular weight ranging from a lower molecular weight of about 188 g/mol to a higher molecular weight of about 488 g/mol. Non-limiting examples of such fluorinated species F include glycidyl tetrafluoropropyl ether, glycidyl octafluoropentyl ether, glycidyl dodecafluoroheptyl ether, glycidyl hexadecafluorononyl ether, heptadecafluorononyl oxirane, dodecafluoro-6-(trifluoromethyl)heptyl oxirane, perfluoroalkylvinyl ethers, hydrophobic fluoropolymers, and combinations thereof. The structures of some suitable fluorinated species F are shown below.

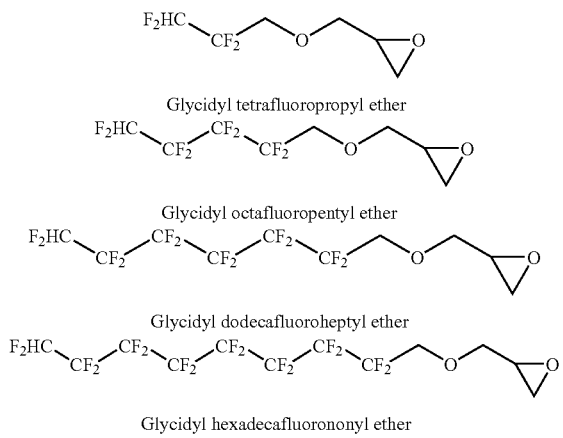

Without being bound to any theory, it is believed that the higher the molecular weight of the fluorinated species F, the more effectively the fluorinated species F increases the contact angle and reduces the surface energy of the epoxy resin layer 16. It is also believed that the lower the molecular weight of the fluorinated species F, the more effectively the fluorinated species F is loaded into the epoxy resin (i.e., the solubility of the species increases).

It is desirable that the amount of high molecular weight fluorinated species added to the epoxy resin be sufficient to increase the contact angle and lower the surface energy of the resulting epoxy resin layer 16, such that the contact angle is higher and the surface energy is lower than those of the nozzle layer 12. In an embodiment, the contact angle of the epoxy resin layer 16 ranges from about 110° to about 130°, while the contact angle of the nozzle layer 12 ranges from about 15° to about 60°.

As each of the higher and lower molecular weight fluorinated species F may achieve desirable effects, in an embodiment, it may be desirable to include a mixture of high and low molecular weight fluorinated species F in the epoxy resin layer 16. Without being bound to any theory, it is believed that by mixing the higher and lower molecular weight fluorinated species F, a relatively large concentration of the higher molecular weight species is able to dissolve in the solvent system. This may be due, at least in part, to the fact that solubility of the lower molecular weight fluorinated species increases as its molecular weight decreases. It is believed that the increased solubility of the lower molecular weight fluorinated species enhances the ability of that species to act as a co-solvent to more efficiently bring the high molecular weight fluorinated species into solution. This embodiment may further increase the effectiveness of reducing the surface energy of the epoxy resin layer 16, at least in part because of the increased amount of higher molecular weight fluorinated species present therein.

In one non-limiting example embodiment including a mixture of the higher and lower molecular weight fluorinated species, glycidyl hexadecafluorononyl ether or glycidyl dodecafluoroheptyl ether may be selected as the higher molecular weight fluorinated species, and glycidyl tetrafluoropropyl ether or glycidyl octafluoropentyl ether may be selected as the lower molecular weight fluorinated species.

As previously stated, the fluorinated species F is dissolved in a solvent system containing one or more solvents. In embodiments including SU8 (e.g., as the epoxy resin), non-limiting examples of suitable solvents include 2-propanone, 1,3-dioxolane, and/or combinations thereof. In embodiments including a photoimageable polysiloxane (e.g., as the epoxy resin), a non-limiting example of a suitable solvent includes mesitylene. In some embodiments, it may be desirable to substantially completely dissolve the fluorinated species F in the solvent(s). It is believed that such dissolution advantageously prevents or reduces the resulting film from having relatively poor photo-imagaibilty and relatively poor physical-chemical integrity.

The substantially dissolved fluorinated species F is then added to the epoxy resin. Suitable epoxy resins for the epoxy resin layer 16 include the previously mentioned dry film lacquers (e.g., photoimageable epoxies, such as, for example, SU8), photoimageable polysiloxane-based chemistries such as Polyset, photoimageable polyimides, polynorbornenes, trimethylbenzene based photoresists, and/or the like, and/or combinations thereof.

In one embodiment of the method, the epoxy resin layer 16 having the fluorine gradient therein is established on the nozzle layer 12. Establishing may be accomplished via any suitable deposition technique, including, but not limited to laminating, dry coating, curtain coating, spin coating (e.g., when a material that is dissolved in a suitable solvent is used) or combinations thereof. It is to be understood that the epoxy resin layer 16 may be selectively deposited such that it is not established in the orifice 14. Such selective deposition may be accomplished, for example, by applying a positive pressure through the layer in which the orifice 14 is formed (the process of which is described further in U.S. patent application Ser. No. 11/138,775, filed May 26, 2005 (published as U.S. Patent Publication No. 2006/0268059 on Nov. 30, 2006), incorporated herein by reference), or by depositing the epoxy resin layer 16 after the orifice 14 has been patterned via exposure and before the orifice 14 has been formed/developed with solvent. In other embodiments, the layer 16 may be established on the nozzle layer 12, and then the orifice 14 may be formed through both layers 12, 16.

In any of the embodiments of the method disclosed herein, the established epoxy resin layer 16 generally has a thickness that is greater than a monolayer. As a non-limiting example, the thickness of the epoxy resin layer 16 is greater than 0.5 microns. In a further non-limiting example, the thickness of the epoxy resin layer 16 ranges from about 2 microns to about 6 microns.

The resulting epoxy resin layer 16 is also substantially robust. In some embodiments, such robustness is exhibited due to the resulting epoxy resin layer 16 being substantially resistant to deleterious effects from subsequent processing techniques (e.g., mechanical attack, chemical attack, etc.). In other embodiments, such robustness is exhibited due to the resulting epoxy resin layer 16 being capable of withstanding subsequent processing (e.g., ashing or oxygen plasma descumming) without being irreversibly deleteriously affected. Without being bound to any theory, it is believed that the increased amount of the fluorinated species F at the surface S contributes to such robustness.

The robustness and thickness of the epoxy resin layer 16 may be desirable to substantially protect the layer 16 from wear due to automated mechanical cleaning and wiping of the printhead over the service life of the product.

In one embodiment, the fluid ejector device 10 is subjected to ashing ($O_2$ plasma ashing). Ashing may be used in downstream processes, specifically during trench etching of the wafer. Ashing aids in removing residue left on the front surface of the wafer, which, if left on the wafer, may prevent or reduce the downstream trench etch from initiating, thereby potentially resulting in an incomplete etch. Such a process may substantially destroy the fluorinated species F located nearest the surface S, and may cause the surface energy of the epoxy resin layer 16 to increase, such that it is closer to the surface energy of the nozzle layer 12.

After such an ashing process, it is believed that embodiments of the fluid ejector device 10 disclosed herein retain a substantial amount of the fluorinated species F, even if the species F at the surface S is destroyed. It is further believed that this is due, at least in part to the fact that the epoxy resin layer 16 has a fluorine gradient with the fluorinated species F being saturated at the surface S and extending into a portion of the thickness of the layer 16.

Furthermore, the surface energy and contact angle of the post-ash epoxy resin layer 16 (having an increased surface energy and decreased contact angle) may desirably be re-established to values that are respectively lower and higher than the surface energy and contact angle of the nozzle layer 12. In an embodiment, this is accomplished by heating the layer 16 to a temperature ranging from about 150° C. to about 20° C. lower than the cure temperature of the epoxy resin used in the layer 16. This heating process may be accomplished for a time period suitable for reducing the surface energy and increasing the contact angle. In an embodiment, heating takes place for a time period ranging from about 30 minutes to about 90 minutes. It is believed that this post-ash bake process re-establishes a desirably high contact angle and low surface energy of the epoxy resin layer 16.

Figure 2:
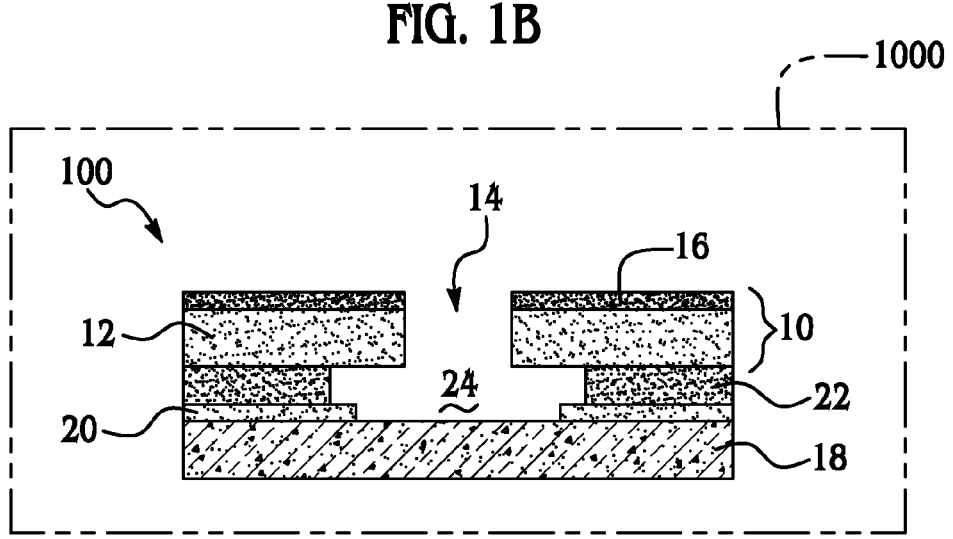
FIG. 2 is a semi-schematic cross-sectional view of an embodiment of an inkjet firing chamber including an embodiment of the fluid ejector device.

Referring now to FIG. 2, an embodiment of a printer 1000 including an inkjet firing chamber 100 incorporating the fluid ejector device 10 is depicted. Generally, the chamber 100 includes a substrate 18, a primer layer 20 established on a portion of the substrate 18, and a chamber-forming layer 22 established on a portion of the primer layer 20. As depicted in FIG. 2, the fluid ejector device 10 is configured such that the nozzle layer 12 is established on the chamber-forming layer 22. The substrate 18 and layers 20, 22 form a chamber 24 having orifice 14 (formed in layers 12, 16) aligned therewith to form an exit for ink stored therein.

The substrate 18 may be any suitable substrate, including, for example, a silicon wafer. Furthermore, the primer layer 20 and the chamber-forming layer 22 may be any layers suitable for storing inkjet inks. A non-limiting example of a suitable material for such layers 20, 22 is SU8, trimethylbenzene based photoresists, polyimides, polymethyl methacrylate (PMMA), polysiloxanes (e.g., Polyset), polynorbornenes, and/or the like, and/or combinations thereof.

In an embodiment of a method of using the embodiment(s) of the fluid ejector device 10, the device 10 is incorporated into a printer 1000 (see FIG. 2), and ink is ejected through the orifice 14 onto a substrate surface (not shown). It is to be understood that as ink is ejected, it does not substantially adhere to the fluid nozzle layer 12 at portions contacting the epoxy resin layer 16, at least in part, because of the reduced surface energy/increased contact angle of this layer 16.

The ink composition may be stored, for example, in the chamber 24 of the inkjet firing chamber 100. The ink composition is ejected from the chamber 24 through the orifice 14 on at least a portion of a media substrate to form an image (graphical, textual, or the like, or combinations thereof). The amount of ink composition used depends, at least in part, on the desirable image to be formed.

Printers suitable for including the device 10 disclosed herein include drop-on-demand inkjet printers, such as thermal or piezoelectric inkjet printers. Non-limiting examples of such printers include portable drop-on-demand inkjet printers (e.g., handheld printers, arm mountable printers, wrist mountable printers, etc.), desktop drop-on-demand inkjet printers, or combinations thereof.

While several embodiments have been described in detail, it will be apparent to those skilled in the art that the disclosed embodiments may be modified. Therefore, the foregoing description is to be considered exemplary rather than limiting.

What is claimed is:

1. A fluid ejector device, comprising:
   a fluid nozzle layer defining an orifice therein; and
   at least one epoxy resin layer established on the nozzle layer, the at least one epoxy resin layer having first and second opposed surfaces with a thickness therebetween and a fluorine gradient formed therein such that the gradient extends into at least a portion of the thickness of the at least one epoxy resin layer, wherein an amount of a fluorinated species present in the at least one epoxy resin layer at the first opposed surface is greater than an amount of the fluorinated species present in the at least one epoxy resin layer at the second opposed surface that is adjacent the fluid nozzle layer;
   wherein a contact angle of the at least one epoxy resin layer is higher than a contact angle of the fluid nozzle layer.

2. The fluid ejector device as defined in claim 1 wherein the epoxy resin layer includes a photoimagable epoxy, photoimageable polysiloxanes, photoimageable polyimides, polynorbornenes, trimethylbenzene based photoresists, or combinations thereof.

3. The fluid ejector device as defined in claim 2 wherein the epoxy resin layer includes the photoimagable epoxy and further includes a solvent system of 2-propanone and 1,3-dioxolane.

4. The fluid ejector device as defined in claim 2 wherein the epoxy resin layer includes the photoimageable polysiloxane and further includes a solvent system of mesitylene.

5. The fluid ejector device as defined in claim 1 wherein the fluorinated species is selected from glycidyl tetrafluoropropyl ether, glycidyl octafluoropentyl ether, glycidyl dodecafluoroheptyl ether, glycidyl hexadecafluorononyl ether, heptadecafluorononyl oxirane, dodecafluoro-6-(trifluoromethyl)heptyl oxirane, perfluoroalkylvinyl ethers, hydrophobic fluoropolymers, and combinations thereof.

6. The fluid ejector device as defined in claim 1 wherein the thickness of the at least one epoxy resin layer ranges from about 2 microns to about 6 microns.

7. The fluid ejector device as defined in claim 1 wherein the contact angle of the fluid nozzle layer ranges from about 15° to about 60°, and wherein the contact angle of the at least one epoxy resin layer ranges from about 110° to about 130°.

8. The fluid ejector device as defined in claim 1 wherein the epoxy resin layer is substantially resistant to subsequent processes selected from ashing, chemical attack, mechanical attack, and combinations thereof.

9. A method of forming a fluid ejector device, comprising:
providing a fluid nozzle layer having an orifice defined therein; and
forming a fluorine gradient in an epoxy resin layer established on the fluid nozzle layer and having first and second opposed surfaces with a thickness therebetween, such that the gradient extends into at least a portion of the thickness of the epoxy resin layer, whereby an amount of a fluorinated species present in the at least one epoxy resin layer at the first opposed surface of the epoxy resin layer is greater than an amount of the fluorinated species present in the at least one epoxy resin layer at the second opposed surface that is adjacent the fluid nozzle layer.

10. The method as defined in claim 9, further comprising:
exposing the epoxy resin layer to at least one subsequent fabrication process, thereby reducing a surface energy of the epoxy resin layer; and
re-establishing the surface energy of the epoxy resin layer.

11. The method as defined in claim 10 wherein re-establishing is accomplished via heating the epoxy resin layer to a temperature ranging from about 150° C. to about 20° C. lower than a cure temperature of an epoxy resin in the epoxy resin layer, for a time period ranging from about 30 minutes to about 90 minutes.

12. The method as defined in claim 10 wherein the at least one subsequent fabrication process is selected from ashing, TMAH wet etch, wafer slotting, wafer sawing, thermal cycles, mechanical abrasion, high pressure water spray, tapping, or combinations thereof.

13. The method as defined in claim 9 wherein forming the fluorine gradient is accomplished by:
adding a predetermined amount of the fluorinated species to a photoimageable epoxy, thereby forming the epoxy resin layer; and
exposing the epoxy resin layer to a predetermined temperature, whereby at least some of the fluorinated species migrates to the surface of the epoxy resin layer.

14. The method as defined in claim 9 wherein the epoxy resin layer is formed substantially simultaneously with the fluid nozzle layer, or is formed after the fluid nozzle layer.

15. The method as defined in claim 14 wherein the epoxy resin layer is formed substantially simultaneously with the fluid nozzle layer, and wherein the epoxy resin layer and the fluid nozzle layer are formed via dry film fabrication.

16. The method as defined in claim 14 wherein the epoxy resin layer is formed after the fluid nozzle layer, and wherein the epoxy resin layer is established via laminating, dry coating, spin coating, curtain coating, or combinations thereof.

* * * * *